March 19, 1963  G. E. HANSEN  3,081,792
BALL VALVE WITH REMOVABLE CARTRIDGE UNIT
Filed March 18, 1960  2 Sheets-Sheet 1

Inventor.
George E. Hansen
By: Joseph O. Lange
Atty.

March 19, 1963  G. E. HANSEN  3,081,792
BALL VALVE WITH REMOVABLE CARTRIDGE UNIT
Filed March 18, 1960  2 Sheets-Sheet 2
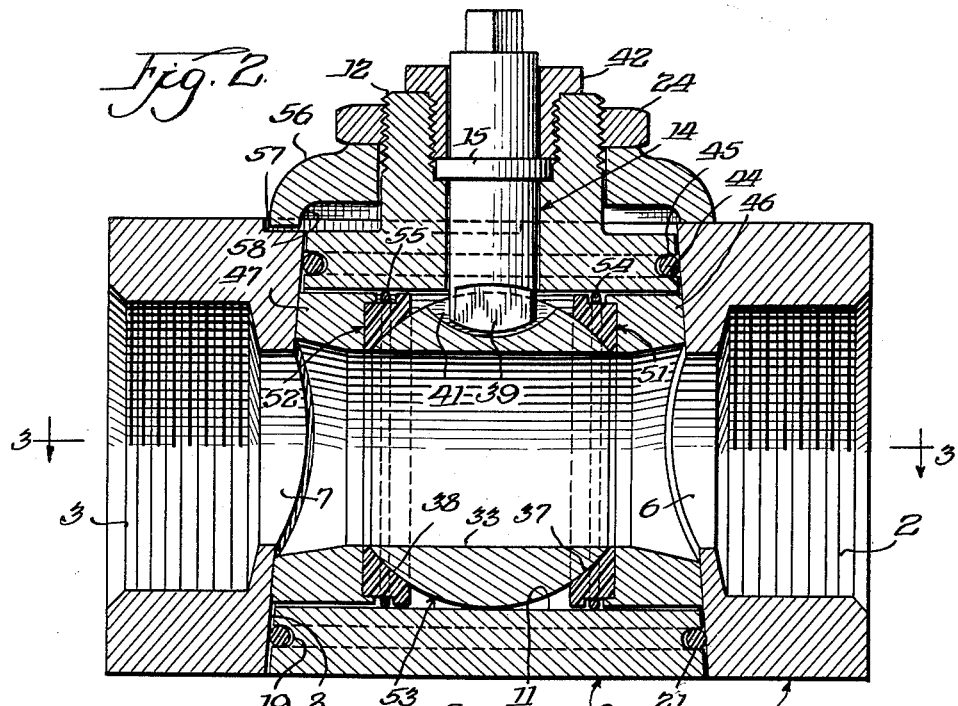
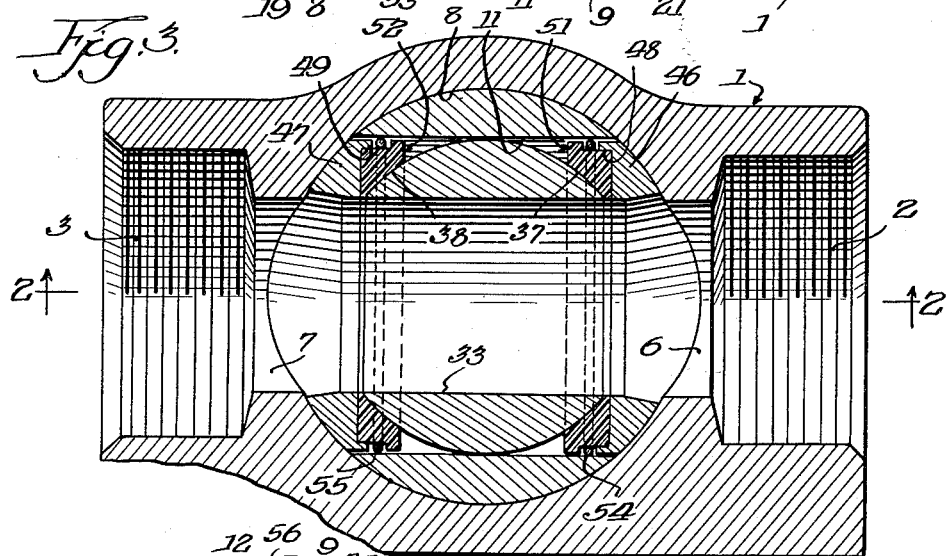
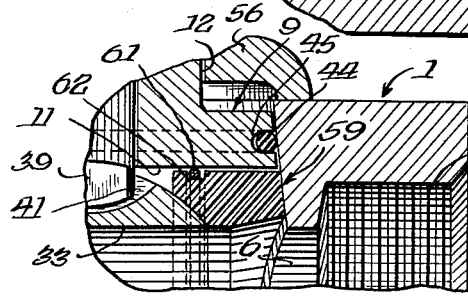
Inventor
George E. Hansen.
By Joseph O. Lange
Atty.

United States Patent Office 3,081,792
Patented Mar. 19, 1963

3,081,792
BALL VALVE WITH REMOVABLE
CARTRIDGE UNIT
George E. Hansen, Elmwood Park, Ill., assignor to Crane Co., Chicago, Ill., a corporation of Illinois
Filed Mar. 18, 1960, Ser. No. 15,975
9 Claims. (Cl. 137—454.2)

This invention relates generally to valves, and, more particularly, it is concerned with a novel design of ball valve in which the plug or cage in the valve body and in which the ported ball is rotatably operated and of frusto-conical or of tapered configuration in the valve body.

Heretofore, it has been one of the problems in connection with this type of construction to provide for the easy and convenient removal of the valve internal parts or trimmings in the event that it becomes necessary to repair or to replace certain of the said parts.

Thus, it is one of the more important objects of this invention to provide for a ball valve construction in which the valve trimmings may be removed easily from the body and preferably as a complete cartridge or unit without the necessity for removing the main valve body from the pipeline upon which the valve is installed.

Another object is to provide for a tapered valve construction for a ball valve in which a relatively simple and durable method is provided for maintaining uniform and proper tension conveniently on the ball closure member and the valve seat rings substantially simultaneously.

Another object is to provide for a ball valve construction, in which by only a slight turn of the adjusting nut as hereinafter described a fine regulation of the thrust against the ball closure member will release or apply the seating pressure in effecting desired seating contacts of the seat rings of the valve with the said closure member.

Another object is to provide for a valve construction in which the body seat rings will not only contact the tapered walls of the valve body, but will also provide for the valve seats closely conforming with the ball contour whereby to maintain valve tightness.

As will also hereinafter become more readily apparent, any axial movement of the frusto-conical plug in either raising or lowering with the body seat rings will enable the ball in said plug to adjust the tension on the ball and the seat rings.

It will also become apparent that a simple method has been provided to allow for adjustment of tightness when wear of the valve parts and valve takes place in the field, as well as for effecting a nice and thoroughly accurate adjustment of the valve exteriorly and without taking the valve out of the line or removing it from its original assembly.

A further object is to provide for a ball valve construction in which the seating arrangement allows for the valve seat rings to be loaded with a uniform tension on the closure ball and sealing the latter member on both sides to thereby permit fluid flow to be discharged in the valve from either direction.

Other objects and advantages will become more readily apparent upon proceeding with the following description read in light of the accompanying drawings, in which:

FIG. 2 is a sectional assembly view of a modified form;

FIG. 3 is a sectional view taken on the line 3—3 of FIG. 2;

FIG. 4 is a fragmentary sectional view of a further modified form.

Similar reference numerals refer to similar parts throughout the several views.

Figure 1:
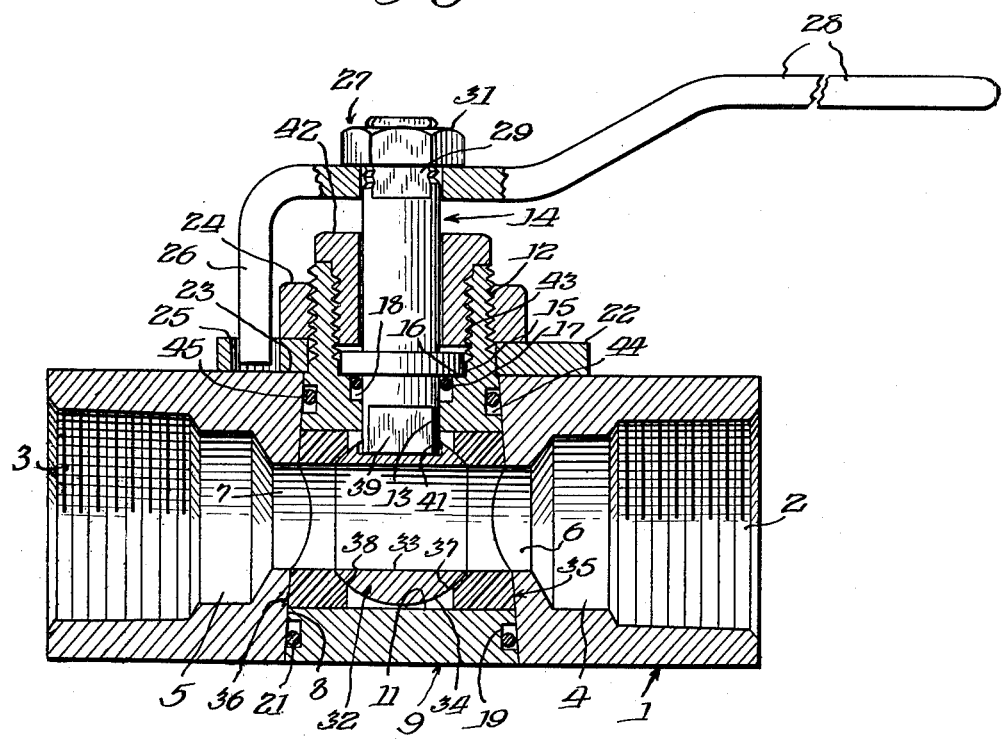
FIG. 1 is a sectional assembly view of a preferred embodiment of my invention.

Referring now to FIG. 1, the valve body or casing generally designated 1 is shown having the usual pipe connecting ends 2 and 3 for attachment by means of the usual pipe threads indicated to a pipeline (not shown). Of course, any other form of pipe-connecting ends may be used, as desired. Both the threads 2 and 3 in the casing are provided at their respective inner ends with the relieved portions or chambers 4 and 5, having at their innermost limits the ports 6 and 7. The latter openings in turn communicate with a frusto-conical valve chamber extending preferably for substantially the full height of the body 1 and as defined by the annular surface or bearing 8.

Snugly fitted within the body or casing 1 is a hollow valve plug or cage of frusto-conical configuration generally designated 9, having its inner hollow portion defined by the transversely extending cylindrical through opening 11 providing for the functional purposes hereinafter set forth in greater detail. At its upper end portion, the said plug 9 is provided with a threaded projecting shank 12. The latter shank portion at its innermost recessed end is apertured as at 13 to receive the rotatably movable stem generally designated 14 having an annularly extending shoulder portion 15 supported upon and bearing journally against the annular surface 16 within the shank recess. The stem is sealed at its lower portion immediately below its annular shoulder portion 15 by means of the O-ring 17 received within the shank chamber 18 as shown. Similarly, at the lower and enlarged end of the frusto-conical plug 9, an annular chamber 19 is provided thereon for receiving the O-ring 21 for sealing purposes, thereby to allow for rotation of the plug 9 when it is desirable to effect the complete shut-off of the valve as hereinafter referred to. Superposed upon an upper surface of the valve body 1, a thrust washer member 22 is abuttingly mounted upon the upper surface 23 of the casing 1, being applied over the threads of the said threaded shank 12 of the plug as indicated. In order to hold the washer member 22 firmly in position, a locknut 24 is applied to the threads of the shank 12 thereby to not only serve the washer 22, as stated, but also to draw up the plug 9 tightly as desired against the frusto-conical surface of the body 1. Preferably, the thrust washer 22 is arcuately relieved at 25 for the purpose of receiving and permitting limited movement of the downwardly extending portion 26 of the handle generally designated 27. It will be understood that the extended portion 28 of the handle is gripped when effecting the desired rotative actuation of the stem 14. The handle is held in non-rotatable relation to the stem on the polygonal shaped portion 29 by means of the handle nut 31.

As to the inner valve mechanism, constituting the ball valve per se, attention is now directed to the construction whereby within the ported portion defined by the annular surface or bore 11, a ported ball or spheroidal member generally designated 32 is mounted in the central portion of said opening and is ported as at 33 to coincide with the body ports 6 and 7 as indicated. Intermediate to said body ports and within the space between the outside spherical surface 34 and the body surface 8, the annular rings generally designated 35 and 36 as illustrated are positioned, having their innermost limits bearing against the ported ball 32 by limits defined by the concave surfaces 37 and 38 respectively, and thus substantially filling the annular chambers between the outer surfaces beyond the concave surface portions 37 and 38 and the end tapered or frusto-conical surface portion 8 of the casing 1. The said rings are upon assembly initially slightly compressed or deformed to fit snugly against said surfaces 37 and 38. It will be apparent that as the plug 9 is drawn up by locknut 24, the plug is tightened within the tapered bore 8 and the respective seat rings 35 and 36 are caused to engage the ball 32 more securely for fluid sealing purposes, the seat rings having concave spherical surfaces on their inside end portions as mentioned for effecting such engagement. The outer surfaces of the rings have annular tapered surfaces formed to coincide with the outer contour of the frusto-conical portion of the tapered plug and the tapered bore 8 in the body to fit snugly therewithin as illustrated.

It will be appreciated that the body frusto-conical machined portion 8 allows for the insertion of the body seat rings before insertions of the plug in the body and with the plug 32 and the rings in place. The latter tapered rings are assembled to fill in the outer surfaces of the plug and are of such configuration to coincide closely with the taper on the plug. Thus, the rings 35 and 36 in the bore contact with the surface 8 referred to engage the rotatable ball and the said tapered bore in the valve body to make the desired fluid sealing joints on both of the surfaces indicated.

The stem 14 at its lower or inner end limit is formed with a polygonal or flattened end portion 39 engaging a substantially similarly formed recess 41 on the upwardly facing portion of the ball plug member 32. A stem hole bushing designated 42 threadedly engages the internal threads 43 of the threaded shank 12 and thus positively retains the shouldered portion 15 of the stem 14 against substantial axial movement outwardly.

In order to prevent fluid leakage past the inverted frusto-conical plug 9, an additional sealing chamber 44 is provided to receive the sealing O-ring 45, functioning in the same manner as described in connection with the lower sealing area for the plug at the large end of the latter member.

It is important to realize that in the normal operation of the valve, the stem, non-rotatably attached to the ball 32, rotates the latter member through a ninety-degree range of rotation defined by the arcuate recess 25, whereby the ball port 33 will no longer coincide with the body openings 6 and 7. Thus, the central openings of the rings 35 and 36 will be at ninety degrees to the rotated transverse position of the ball closure port 33 and the valve is then in the fully closed position. The lower portion of the handle at 26 moves between the quadrant relieved portion defined by the surfaces 25 (only one of which is shown) ninety degrees apart to establish such range of rotation of the valve stem and ball.

It should be appreciated that in such instances in which it becomes necessary because of a major failure to obtain tightness between the ball 32 and the valve seat rings 35 and 36 the entire plug portion 9 may be rotated to a ninety-degree position by simply engaging the outer end of shank tightening nut 24, thus loosening the latter member and then rotating the said plug so that the ports 6 and 7 in the body are shut off through the ninety-degree movement of the plug 9 from the position shown. In the latter position, it no longer coincides with the opening defined by the bore 11 through the plug 9. Under such emergency conditions, it will be therefore understood that the complete plug including the ball stem and seat rings can be turned as a unit to act as an effective auxiliary shutoff whenever it becomes necessary. In such cases, the stem can be replaced or repaired if necessary.

Therefore, it will be apparent that a relatively compact and sturdy valve construction has been provided for extremely high pressure and severe service conditions and because the valve plug 9 is at all times in engagement with the frusto-conical bore 8, it will also be appreciated that there is no danger of foreign matter or sediment entering from the pipe line upon the frusto-conical surface 8 of the casing to thereby objectionably interfere with the proper fluid sealing function of the valve even under extremely strenuous conditions of service.

It should be realized that the particular configuration of the seat rings 35 and 36 employed may be changed substantially from the form hereinabove immediately described to the modifications shown in the following figures and remain within the purview of this invention.

Directing attention accordingly now to FIG. 2, the valve body or casing is similarly shown and designated 1, having the usual threaded connections 2 and 3 as hereinabove described and for the purpose aforesaid, the valve body in the same manner being provided with a frusto-conical bore 8 in which the tapered valve plug 9 apertured as at 11 receives oppositely disposed valve seat retaining members 46 and 47, which preferably are metallic, but not necessarily so, and assume the general configuration indicated more clearly in the sectional view in FIG. 3. As shown, they are preferably provided with the outwardly flared passages communicating with the respective body ports 6 and 7. (Also FIG. 4.) The said seat retaining members are provided with the encompassing shallow recesses 48 and 49 respectively provided for receiving the seating rings generally designated 51 and 52 respectively, bearing against the ball member generally designated 53 in much the same manner as described in connection with the previous figure. The said seating rings are preferably of a suitable softer composition and may therefore be non-metallic, although service conditions will undoubtedly dictate the proper material to be used. The ball member engages the spherically concave surfaces 37 and 38 of the rings 51 and 52. Similarly, the stem generally designated 14 is provided with a lower end portion of polygonal form as at 39 to engage a similarly formed recess 41 of the ball member 53. The plug 9 is sealed at its upper end lower portions of the frusto-conical surfaces formed by the bore 8 in the same manner as described in connection with FIG. 1. The stem 14 also is provided with the integral enlarged collar 15 which is engaged by means of the retaining stem bushing 42 in the same way as described previously for the previous figure whereby to hold the said stem against excessive axial movement.

In connection with the transverse bore 11 through the plug 9, the annular seat rings 51 and 52 of uniform thickness are preferably fitted on their outer periphery with the encompassing O-rings 54 and 55 respectively. As previously stated, the outwardly surrounding contacting portions 46 and 47 preferably are made of metal and fit snugly as indicated more clearly in FIG. 3 within the frusto-conical bore 8 and thus exerting an inwardly applied thrust end upon the members 51 and 52 to result in the intimate seating contact described previously between the apertured ball 53 and the seat rings 51 and 52 to effect desirable valve tightness insofar as fluid sealing is concerned.

In the same manner as described in connection with FIG. 1, the valve plug 9 at its upper portion is provided with the threaded shank 12 over which the thrust washer 56 is positioned as indicated and is held snugly in place against end thrust by means of the locknut 24. In this construction, the thrust washer 56 is mounted as indicated and is firmly positioned by means of the locknut 24 drawn up as indicated. In this construction, the thrust washer 56 may be suitably limited in its rotation by the combined means of the recessed portion 57 being engaged by the depending section 58 suitably upon predetermined rotation of the plug 9 under the previously described conditions of operation and above referred to.

It will be apparent that in all respects the manner of operation of this modified form of ball valve is substantially the same as that described with respect to the earlier figure, except in this case the outer surfaces are preferably provided by the metallic members 46 and 47 to effect the seating contact as an interposed member behind the seating contact rings 51 and 52 directly with the ported ball member 53. Thus, it is clear that the invention is capable of a number of modifications.

Referring now to a further modified form shown in FIG. 4, a similar valve casing construction is used as indicated, but in this modification, the combined seating members 46, 47, 51, and 52 are consolidated or formed integrally thereby to produce the oppositely disposed rings (one of which is shown) designated 59 in which the rotating plug generally designated 9 is of the same frusto-conical configuration as previously described and which is sealed in the same manner as at 44 and 45. The plug construction is mounted in sealed relation to the plug through bore 11 by means of the O-ring 61 received within the annular chamber 62. In all other respects, the operation is identical to that previously described, but here the only advantage gained is that a lesser number of valve parts are employed and, under certain conditions, it may be desirable to make contact with a composition member of which the ring 59 is made rather than a metal-to-metal contact. In general, it follows the form of construction illustrated in FIG. 1.

While a number of embodiments have been shown and described, it will of course be appreciated that the primary contribution of this invention lies in the use of a frusto-conical or tapered plug construction, maintaining uniform and proper tension on both the rotating spherical member and the seat rings by the simple but effective expedient of tightening the surrounding plug member 9 in position. A simple method in both assembling and disassembling a valve construction suitable for excessive pressures and temperatures has been accomplished. It may of course take other forms than those illustrated and described.

The invention accordingly should be interpreted in light of the appended claims.

I claim:
1. In a ball valve;
   a body having a flow passageway therethrough and with side walls forming a frusto-conical central chamber interrupting said passageway;
   seat rings oppositely disposed in said central chamber with inner end portions thereof being defined by substantially concave annular surfaces;
   the outer end limits of the said seat rings having arcuately extending annular surfaces with a curvature defined by the body surface forming the end wall portions of said frusto-conical central chamber of the body;
   the said curved annular surfaces of the seat rings co-acting with said body surface to provide a fluid sealing contact therewith around said body passageway;
   a ported spheroidal closure member interposed between said seat rings and mounted for rotational slidable movement relative to the concave inner end surfaces of said seat rings;
   said closure member having a port opening extending therethrough in substantial axial alignment with the said body flow passageway;
   said closure member having convex surface portions normally received within the concave inner end surfaces of said seat rings in fluid sealing relation;
   the concave inner end surfaces formed in the said seat rings normally having a radius common to each other and to the said closure member when assembled with the latter member;
   rotatable stem means having an inner end limit engageable by said closure member to effect rotation of said closure member;
   a hollow ported plug member wholly received directly on an outer surface within the body central chamber substantially normally non-rotatably and enclosing said assembly of said closure member and seat rings within the ported portion thereof;
   said stem means being journaled in the plug member and being held against substantial endwise movement within an outwardly opening recessed portion of said plug member;
   removable attachment means cooperating with said hollow plug member recessed portion for securing said plug member to said body;
   the said plug member being of frusto-conical configuration on said outer surface received directly within the body central chamber and being maintained within said body in fluid sealing relation thereto by said removable means thereon cooperating with an annular wall constituting said recessed portion of the plug member.

2. The subject matter of claim 1, annular sealing means disposed transversely around portions of said ported plug member in planes within said body substantially parallel to the axis of said body passageway immediately above and below the ported portion of the said plug member.

3. The subject matter of claim 1, the said oppositely disposed seat rings being annularly split and forming a second set of rings in said ported plug member mounted outwardly of said first named seat rings, the said second set of rings being interposed to extend around and define an annular wall portion of the body flow passageway between said first named set of seat rings and said body to effect fluid sealing contact therebetween and retain said first-named rings against said closure member.

4. The subject matter of claim 3, each of the second set of said rings being limitedly movable axially within the port of said ported plug member, said latter movability being in a direction toward said closure member upon assembly of the valve and predetermined axial movement of the said plug member in the said body in a direction substantially transverse to the central axis of the body flow passageway and toward the smaller end portion of the body frusto-conical central chamber.

5. In a ball valve;
   a body having a flow passageway therethrough with a central substantially frusto-conical chamber interrupting said passageway;
   seat rings in said central chamber having substantially concave inner end annular surfaces with outer end surfaces curved to conform to the frusto-conical chamber;
   a ported spheroidal closure member rotatably disposed between said seat rings and mounted for rotational slidable movement relative to the said concave inner annular end surfaces of said seat rings with the port thereof axially aligned with said body passageway;
   the concave inner end surfaces formed in the said seat rings normally having a radius common to each other and to the said closure member when assembled with the latter member in said slidably movable relation;
   stem actuating means for rotating said closure member; and
   a normally non-rotatable frusto-conical hollow ported plug member mounted in fluid sealing relation within the said body chamber for supporting said assembly of the closure member and said seat rings within the ported portion thereof to substantially fill the latter portion;
   said plug member having a transverse wall portion apertured immediately above the plug ported portion to permit said stem actuating means to project therethrough to contact said closure member for effecting rotation of the latter member;
   said plug member having means cooperating with said body to provide for said plug member being axially adjustable transversely relative to the body upon limited predetermined axial movement of said plug member.

6. In a ball valve;
   a body having a flow passageway therethrough with a central frusto-conical chamber interrupting said passageway;
   deformable seat rings in said central chamber having substantially concave oppositely disposed annular surfaces;
   a spheroidal closure member interposed between said seat rings and mounted for rotational slidable movement relative to the said concave surfaces of said seat rings and with a through port axially aligned with said body passageway;

said closure member having curved outer surfaces normally making fluid sealing contact with said annular surfaces of said seat rings; and a normally non-rotatably hollow ported plug member snugly received within the body central chamber for containing said assembly of said closure member and seat rings within the ported portion thereof;

said seat rings and closure member when assembled extending for the full length of the port of said plug member as established by the wall defining said central frusto-conical body chamber;

the said plug member being of frusto-conical configuration on its outer surface received directly within the body except for the ported portion thereof and being adjustably maintained by said body in fluid sealing relation thereto to permit limited endwise movement;

stem actuating means for rotating said closure member;

said plug member having a transverse ported partition forming an arcuate portion of the port of said plug member;

said stem actuating means projecting through said ported partition to engage said closure member for effecting rotation of the latter member;

the said seat rings and closure member substantially lining said port of the plug member;

the said body and plug cooperating to tighten said plug in the body whereby to move said seat rings axially predeterminately in directions toward said closure member to thereby deform said rings against said closure member upon suitable endwise movement of said plug member in the body frusto-conical chamber in the course of said tightening of said plug member.

7. In a ball valve;

a body having a flow passageway therethrough with a central frusto-conical chamber interrupting said passageway;

deformable seat rings in said central chamber having substantially concave inner end surfaces;

a spheroidal ported closure member interposed between said seat rings and mounted for rotational sliding contact relative to the said concave inner end surfaces of said seat rings;

stem means for rotating said closure member;

said closure member having outer arcuate surface portions normally received within the concave inner end surfaces of said seat rings to effect valve tightness upon predetermined rotation of said closure member;

the concave inner end surfaces formed in the said seat rings normally having a radius substantially common to each other and to the said closure member when assembled with the latter member;

seat ring retaining means mounted between outer annular end portions of said seat rings and a curved surface defining said body chamber;

said retaining means annularly engaging said outer annular end portion of said seat rings for inhibiting the deformable distortion of the seat rings beyond said rotational sliding contact with said closure member; and a hollow ported plug member having a recessed transversely apertured partition therewithin for journaling said stem means and being received within the body central chamber for carrying said assembly of said closure member, seat rings, an inner portion of said stem means and seat ring retaining means within the ported portion thereof;

the said plug member being of frusto-conical configuration on its outer surface wholly received in direct contact within the body and being normally contained within said body in fluid sealing non-rotatable relation thereto.

8. The subject matter of claim 7, the said retaining ring means having outwardly expanding ports therethrough of substantially outwardly flared configuration communicating at their largest opening with said body flow passageway.

9. The subject matter of claim 7, the said ring retaining means having annular lip means for receiving and guiding at least a portion of said seat rings within the port of said plug member, sealing means for the seat rings and ring retaining means mounted annularly between said seat rings and the said annular lip means of said retaining ring means within the ported portion of said ported plug member.

References Cited in the file of this patent

UNITED STATES PATENTS

| | | |
|---|---|---|
| 1,342,051 | Lapenda | June 1, 1920 |
| 1,941,839 | Johansson | Jan. 2, 1934 |
| 2,106,310 | Warrick | Jan. 25, 1938 |
| 2,604,293 | Phillips | July 22, 1952 |
| 2,621,888 | Allen | Dec. 16, 1952 |
| 2,664,263 | Stadler | Dec. 29, 1953 |
| 2,708,096 | Mueller | May 10, 1955 |
| 2,885,179 | Hartmann | May 5, 1959 |
| 2,890,856 | Clade | June 16, 1959 |
| 2,895,710 | Sanctuary | July 21, 1959 |
| 2,898,081 | Johnson | Aug. 4, 1959 |
| 2,932,311 | Scherer | Apr. 12, 1960 |
| 2,963,262 | Shafer | Dec. 6, 1960 |
| 2,994,343 | Banks | Aug. 1, 1961 |
| 3,000,393 | Maynard | Sept. 19, 1961 |

FOREIGN PATENTS

| | | |
|---|---|---|
| 712,825 | France | Aug. 3, 1931 |